United States Patent [19]
McDonough

[11] 3,720,187
[45] March 13, 1973

[54] CATTLE RESTRAINING STANCHION
[76] Inventor: William P. McDonough, Box 836, Gunnison, Colo. 81230
[22] Filed: Feb. 8, 1971
[21] Appl. No.: 113,556

[52] U.S. Cl. ................................................... 119/98
[51] Int. Cl. .............................................. A61d 3/00
[58] Field of Search .................................. 119/98, 99

[56] References Cited

UNITED STATES PATENTS 2,438,322   3/1948   McDonough ........................... 119/99
2,999,480   9/1961   Sparkman ............................... 119/98

FOREIGN PATENTS OR APPLICATIONS 256,282   9/1964   Australia

Primary Examiner—Hugh R. Chamblee
Attorney—Clarence A. O'Brien and Harvey B. Jacobson

[57] ABSTRACT

An animal catching gate including an upstanding frame having opposite sides and from which a pair of upstanding stanchion bars are supported for movement toward and away from each other along paths generally paralleling the medial plane of the frame. The lower ends of the stanchion bars are oscillatably supported from the frame for guided movement toward and away from each other and also for oscillation relative to each other and the frame about axes disposed generally normal to the frame. Actuating structure is also supported from the frame and operatively connected to the stanchion bars for shifting the stanchion bars toward and away from each other, the actuating structure, when actuated to open the catch gate, being operable to slid the lower ends of the stanchion bars apart while at the same time swinging the upper ends of the stanchion bars away from each other. Also, one side of the frame of the catch gate includes a stop gate panel member oscillatably supported therefrom for angular displacement about an axis disposed generally normal to the frame between a retracted depending position disposed at one side of the frame and a raised operative position extending between the stanchion bars when the latter are open.

8 Claims, 4 Drawing Figures

William P. McDonough
INVENTOR

William P. McDonough
INVENTOR

CATTLE RESTRAINING STANCHION

The cattle restraining stanchion of the instant invention has been specifically designed for use either on a complete cattle chute or in a squeezing alley. The stanchion is provided with a single actuating lever and it opens toward both sides at its top and bottom merely by actuation of the single actuating lever. Further, the actuating lever of the stanchion is disposed in an out of the way position when the stanchion is closed and means is provided whereby the stanchion bars may be secured in adjusted closed position.

The stanchion further includes a stop gate operable independently of the stanchion bars. The stop gate may be swung to the closed position extending between the stanchion bars slightly below the level thereof between which the neck of an animal is to be received and the gate will prevent an animal from charging through the stanchion before the stanchion bars can be closed. After the animal has been stopped at the stanchion by the stop gate with the neck of the animal disposed over the gate, the stanchion bars may be closed to grip the opposite sides of the neck of the animal and the stop gate may be dropped so as not to choke the animal while its neck is held between the stanchion bars. Accordingly, the stop gate is utilized to more rapidly position an animal relative to the stanchion for gripping the animals neck between the stanchion bars and is dropped to an out of the way position as the stanchion bars are moved to the closed positions thereof whereby it is merely necessary to release the stanchion bars whenever it is desired to release the animal, the stop gate having been previously dropped.

The main object of this invention is to provide an improved stanchion for use in controlling the movement of livestock and retaining livestock stationary for matters such as inspection, surgery, grooming and the like.

Another object of this invention is to provide a stanchion equipped with an independently operable gate whereby an animal may not bolt through the stanchion when the stanchion bars thereof are in the open positions.

A still further object of this invention is to provide a stanchion that may be used either on a complete cattle chute or separately in a squeezing alley.

Another important object of this invention is to provide a stanchion that may be actuated by the manipulation of a single hand lever.

A final object of this invention to be specifically enumerated herein is to provide a stanchion which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
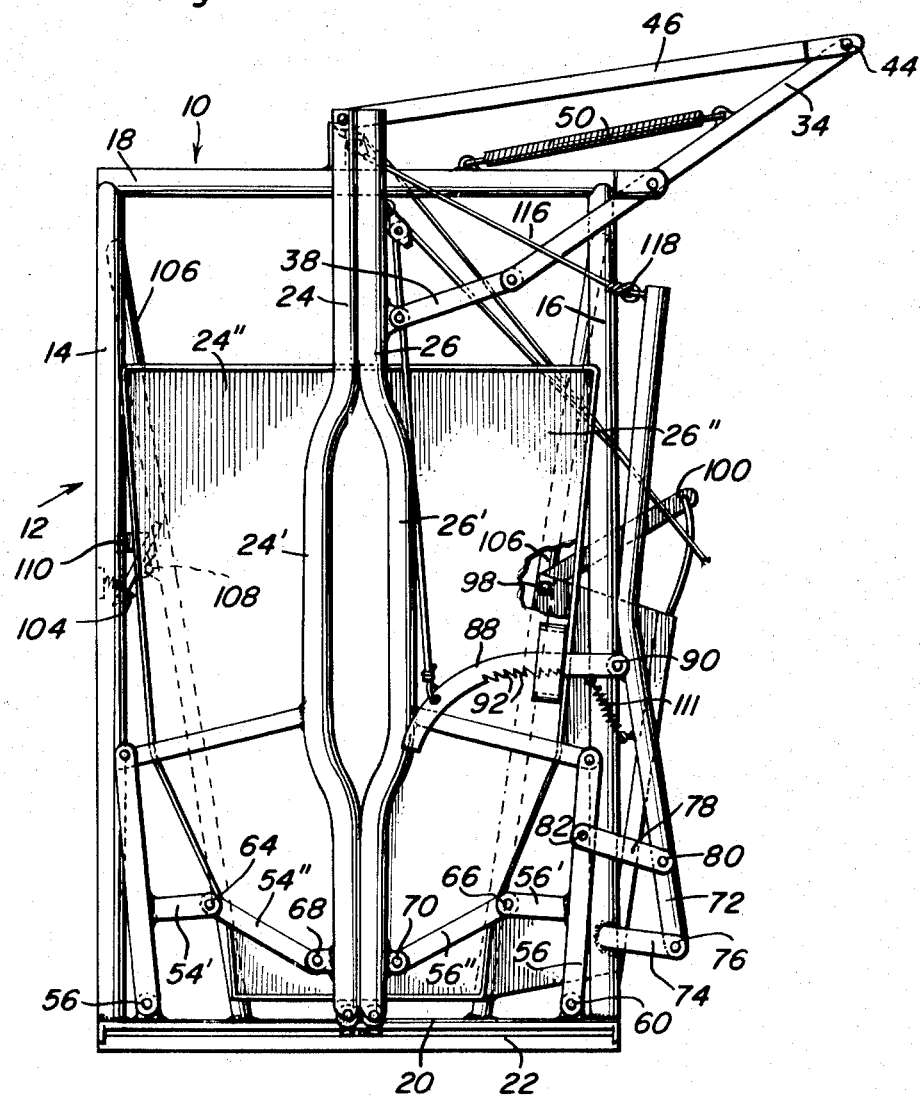
FIG. 1 is an elevational view of the animal catch gate with the stanchion bars thereof in their closed positions and the stop gate thereof in the open position.
Figure 4:
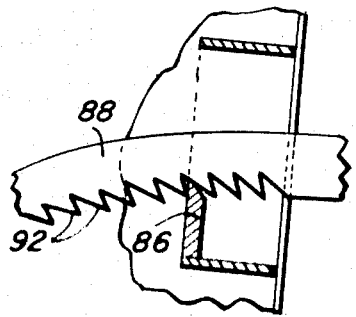
FIG. 4 is a fragmentary vertical sectional view illustrating the latch mechanism by which the stanchion bars may be retained in selectively closed positions.

Referring now more specifically to the drawings, the numeral 10 generally refers to the stanchion or animal catch gate of the instant invention. The stanchion 10 includes a support frame referred to in general by the reference numeral 12 and the frame 12 may be seen to include a pair of upstanding opposite side members 14 and 16 interconnected at their upper ends by means of an upper transverse member 18 and at their lower ends by means of a pair of slightly vertically spaced lower transverse members 20 and 22.

A pair of stanchion bars 24 and 26 are provided and the bars 24 and 26 include oppositely bowed intermediate portions 24' and 26' generally centrally intermediate their upper and lower ends.

The lower ends of the bars 24 and 26 are bifurcated and each lower bar end includes a pair of furcations 28 and 30 between which a roller 32 is journalled. The rollers are rollingly disposed on the lower transverse member 20 and the furcations 28 include lateral extensions 34 received between the lower transverse members 20 and 22. In this manner, the lower ends of the bars 24 and 26 are not only slidably supported from the lower transverse member 20 for guided movement therealong but are also supported for oscillation about the axes of rotation or the rollers 32.

Figure 2:
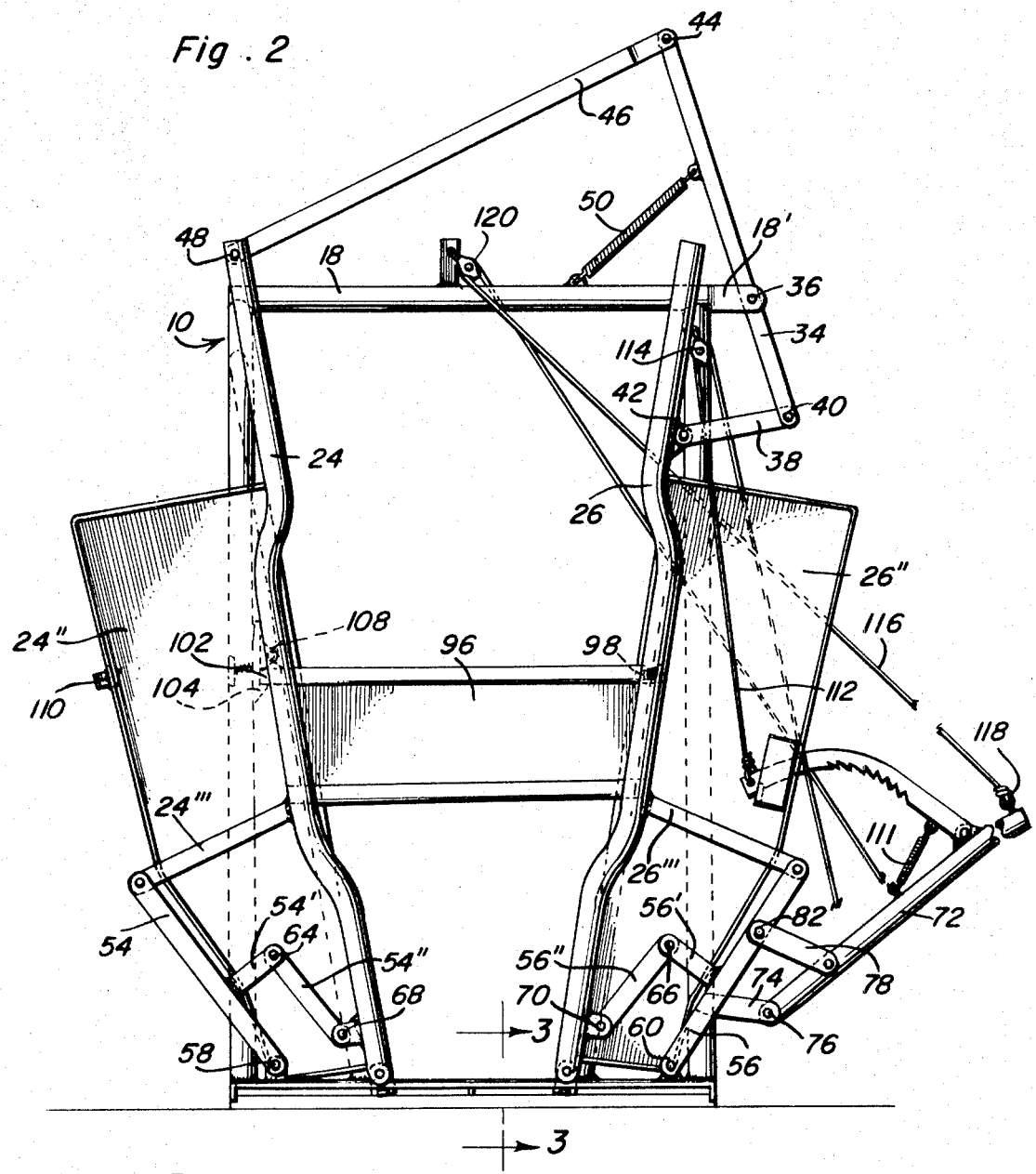
FIG. 2 is an elevational view similar to FIG. 1 but with the stanchion bars in their open positions and the stop gate in its closed position.
Figure 3:
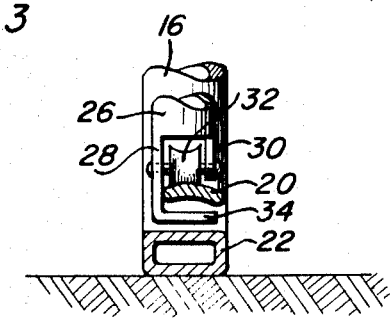
FIG. 3 is an enlarged fragmentary vertical sectional view taken substantially upon the plane indicated by the section line 3—3 of FIG. 2.

As viewed in FIGS. 1 and 2 of the drawings, the right hand end of the upper transverse member 18 includes a bifurcated extension 18' between whose furcations a first connecting lever 34 is oscillatably supported by means of a pivot fastener 36. The lever 34 is supported between the furcations of the extension 18' intermediate its opposite ends and one end of the connecting lever 34 has one end of a connecting link 38 pivotally secured thereto as at 40, the other end of the connecting link being pivotally secured to the upper end portion of the stanchion bar 26 by means of a pivot fastener 42. The end of the connecting lever 34 remote from the connecting link 38 is pivotally connected, as at 44, to one end of a second connecting lever 46 and the other end of the connecting lever 46 is pivotally secured to the upper end of the stanchion bar 24 as at 48. Further, an expansion spring 50 is connected between the upper transverse member 18 and the first connecting lever 34 and yieldingly biases the connecting lever 34 in a clockwise direction as viewed in FIGS. 1 and 2 of the drawings to thereby urge the stanchion bars 24 and 26 toward their open positions illustrated in FIG. 2 from the closed positions thereof illustrated in FIG. 1.

The stanchion bars 24 and 26 include wing plates 24" and 26", respectively, as well as a pair of oppositely outwardly directed operating arms 24''' and 26'''.

A pair of operating links 54 and 56 have one pair of corresponding ends thereof pivotally supported from the opposite ends of the lower transverse member 20 as at 58 and 60 and the operating links include laterally projecting stub arms 54' and 56' projecting toward each other and supported therefrom intermediate their upper and lower ends. Also, a pair of connecting links 54" and 56" have one pair of corresponding ends thereof pivotally secured to the adjacent ends of the stub arms 54' and 56' as at 64 and 66 and the other pair of corresponding lower ends thereof pivotally secured to the stanchion arms 24 and 26 as at 68 and 70.

An operating lever 72 has its lower end pivotally secured to the outer end of a laterally outwardly projecting stub arm 74 supported from the lower end of the side member 16 as at 76 and a connecting link 78 has one end thereof pivotally secured to the operating lever 72 as at 80 and the other end thereof pivotally secured to the operating link 56 as at 82.

The wing plate 26" has a latch pawl flange 86 supported therefrom and a latch bar 88 has one end thereof pivotally supported from the operating lever 72 as at 90. The latch bar 88 includes longitudinally spaced teeth 92 engageable with the latch pawl flange 86 and accordingly, the latch bar 88 may be lowered into engagement with the latch pawl flange 86 in to retain the stanchion bars 24 and 26 in a predetermined closed position against movement away from each other.

A stop gate 96 is pivotally supported from the right hand inclined brace 106 of the frame 12, see FIG. 1, and includes an operating handle 100. The free swinging end of the gate 96 includes a keeper extension 102 and a spring urged latch 104 is pivotally supported from the left hand inclined brace 106 of the frame 12 as at 108 and engageable with the keeper extension 102 when the gate 96 is swung to the horizontal closed position thereof illustrated in FIG. 2 of the drawings. Also, the wing plate 24' includes an abutment 110 engageable with the upper end of the latch 104 when the stanchion bars 24 and 26 are shifted to their closed positions illustrated in FIG. 1 in order to release the gate 96 for gravity swinging from the closed position thereof illustrated in FIG. 2 to the open position thereof illustrated in FIG. 1 as the stanchion bars 24 and 26 are closed.

An expansion spring 111 is connected between the lock or locking bar 88 and the operating lever 72 so as to yieldingly bias the lock bar 88 into position with its teeth 92 engaged with the flange 86. One end of an elongated flexible tension member 112 is anchored to the free end of the locking bar 88 and is passed over a pulley 114 carried by the upper end portion of the stanchion bar 26. The other end portion of the tension member 112 is directed downwardly along the right hand side of the stanchion 10 as viewed in FIGS. 1 and 2 of the drawings. A second elongated flexible tension member 116 is provided and has one end thereof anchored to the free end of the operating lever 72 as at 118 and the other end of the tension member 118 passes over a pulley 120 supported from the center of the upper transverse member 18. The terminal end of the tension member 116 remote from the pulley 118 is also retained at the right hand side of the stanchion 10.

In operation, when it is desired to retain an animal in the stanchion 10, the actuating or lever arm 100 of the gate 96 is urged downwardly at its free ends to swing the gate 96 to its raised horizontal position illustrated in FIG. 2 of the drawings with the extension 102 engaged by the latch 104. Then, as the animal is advanced toward the stanchion 10 and its head passes over the upper marginal edge portion of the gate 96, the operating lever 72 is pushed upward from the position thereof illustrated in FIG. 2 to the position thereof illustrated in FIG. 1 or the end of the tension member 116 remote from the point 118 is pulled to affect the same upward swinging of the operating lever 72. Upward swinging of the free end of the operating lever 72 will of course cause the upper ends of the stanchion bars 24 and 26 to swing toward each other and the lower ends of the stanchion bars 24 and 26 to slide together along the transverse member 20. As the stanchion bars 24 and 26 are shifted to their fully closed positions illustrated in FIG. 1 of the drawings, the abutment 110 is operable to engage the latch 104 and to pivot the latter to its inoperative position thereby releasing the gate 96 for pivoting by gravity from the operative position thereof illustrated in FIG. 2 of the drawings to the inoperative position illustrated in FIG. 1 of the drawings.

After the animal has been retained for the desired period of time, the free end of the tension member 112 may be pulled so as to raise the locking bar 88 and release the stanchion bars 24 and 26 for swinging from the closed positions thereof illustrated in FIG. 1 of the drawings to the open positions thereof illustrated in FIG. 2 of the drawings under the biasing action of the expansion spring 50. Of course, after the animal has been released, the free end portion of the operating arm or lever 100 of the gate 96 is again swung downwardly to return the gate 96 to the closed position thereof illustrated in FIG. 2 of the drawings preparatory to the next animal passing his head over the upper marginal edge portion of the gate 96.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An animal stanchion including an upright support having opposite side members and a lower transverse marginal portion, said support defining a passageway extending therethrough between said opposite side members, a pair of side by side upstanding stanchion bars, means supporting the lower ends of said bars from said marginal portion for guided shifting therealong toward and away from each other and oscillation of said bars about horizontal axes disposed generally normal to the planes in which the bars are shiftable and shiftable with the bars for swinging movement of the upper ends of said bars toward and away from each other, and operating means operatively connected between said support and said bars for alternately simultaneously sliding the lower ends of said bars apart and angularly displacing said bars about said axes in opposite directions to swing the upper ends of the bars away from each other and sliding the lower ends of the bars toward each other and angularly displacing said bars about said axes to swing the upper ends of the bars toward each other, said stanchion including a stop gate pivotally supported from one of said side members for movement between an upstanding retracted position disposed along said one side member and a horizontal position spanning the distance between said bars when the latter are shifted apart, the other of said side members including latch means operable to releaseably retain said stop gate in said horizontal position, the upstanding stanchion bar adjacent said other side member including latch actuating means operable to release said latch means upon movement of said stanchion bars toward each other for allowing said stop gate to fall by gravity to its upstanding inoperative position disposed along said one side of said support.

2. An animal stanchion including an upright support having opposite side members and a lower transverse marginal portion, said support defining a passageway extending therethrough between said opposite side members and above said lower transverse marginal portion, a pair of side by side upstanding stanchion bars, means supporting said bars from said support for movement toward and away from each other, a stop gate pivotally supported from one of said side members for swinging movement between a depending position disposed along said one side member and a horizontal position spanning the spacing between said bars and disposed at an elevation above said lower transverse marginal portion and below the upper ends of said bars, latch means operable to releaseably retain said stop gate in said horizontal position, one of said bars including latch actuating means engageable with said latch means upon movement of said bars toward each other for releasing said latch means and allowing said stop gate to pivot by gravity to its inoperative upstanding position disposed alongside said bar.

3. The combination of claim 1 wherein said bars, intermediate their upper and lower ends, include laterally displaced portions defining recesses opening toward each other.

4. The combination of claim 1 including means operative to yieldingly bias said stanchion bars away from each other.

5. The combination of claim 4 including releaseable means operative to retain said stanchion bars in selected spaced apart positions against further displacement away from each other.

6. The combination of claim 1 wherein said means supporting the lower ends of said bars for shifting along said lower marginal portion and oscillation about said horizontal axes comprise rollers carried by the lower ends of said bars rollingly engaged with said lower transverse marginal portion.

7. The combination of claim 6 including means operative to yieldingly bias said stanchion bars away from each other.

8. The combination of claim 7 including releaseable means operative to retain said stanchion bars in selected spaced apart positions against further displacement away from each other.

* * * * *